UNITED STATES PATENT OFFICE.

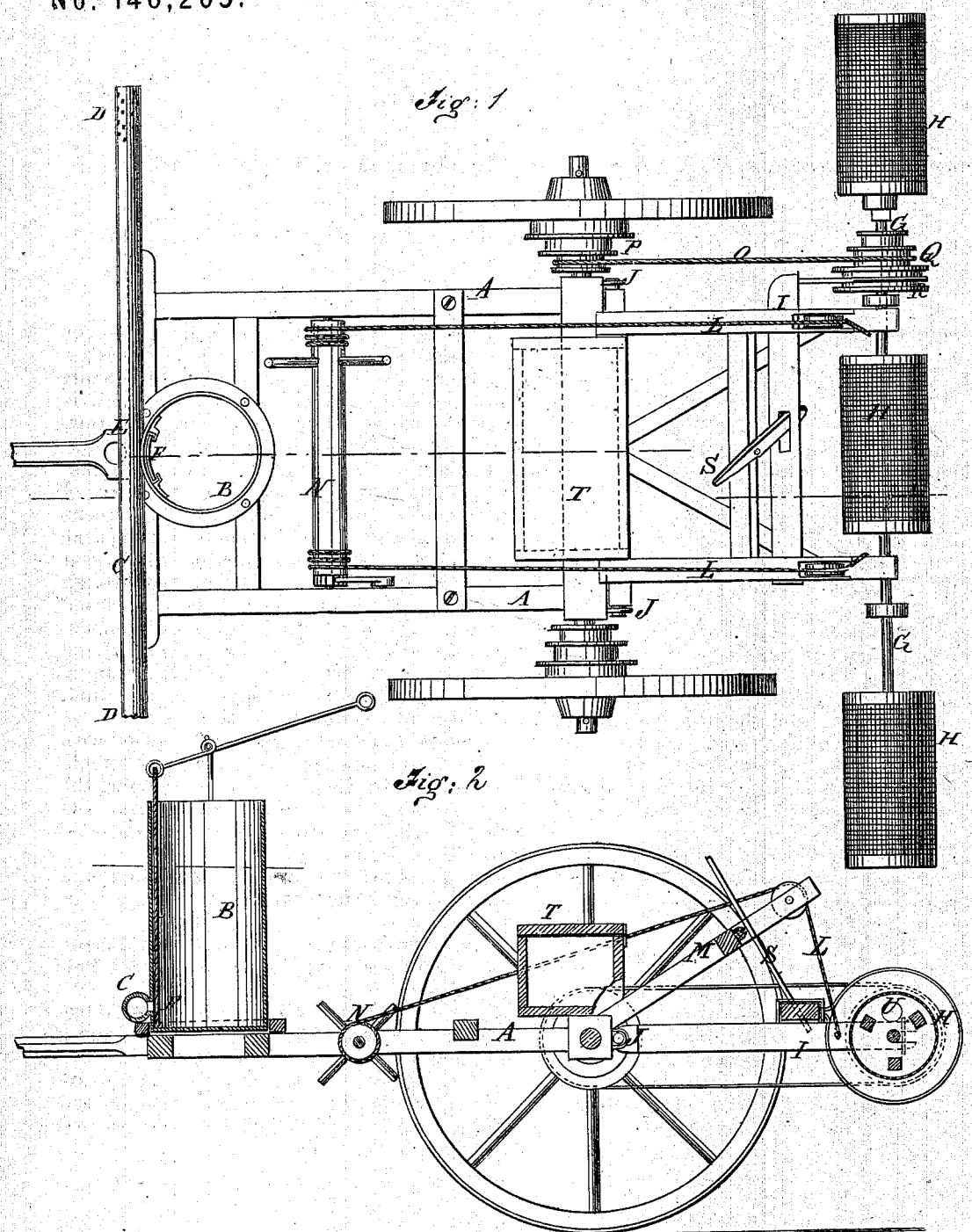

WILLIAM T. ROBINSON, OF HUNTSVILLE, TEXAS.

IMPROVEMENT IN MACHINES FOR SPRINKLING COTTON-PLANTS.

Specification forming part of Letters Patent No. 146,205, dated January 6, 1874; application filed October 18, 1873.

*To all whom it may concern:*

Be it known that I, WILLIAM T. ROBINSON, of Huntsville, in the county of Walker and State of Texas, have invented a new and Improved Machine for Sprinkling Cotton-Plants, of which the following is a specification:

The invention will first be fully described, and then pointed out in the claim.

Figure 1 is a plan view, and Fig. 2 is a longitudinal sectional elevation, of my improved sprinkling-machine.

Similar letters of reference indicate corresponding parts.

A is a two-wheeled truck, of proper height and width to run along above one row, and provided with a tongue to hitch on the animals, so as to go on opposite sides of the row. B is a liquid-holding tank on the front part of the frame. C is a sprinkling-tube, connected with the tank and extending across the frame, and beyond far enough to reach the two outside rows, and having small perforations D at the ends, and also at the middle, E, for sprinkling the liquid upon three rows of cotton. A gate or valve, F, is arranged in the tank to shut off the liquid from the sprinkling-tube when it is not required to flow, and also regulate the discharge. The end of this tube is to be closed with a cap or plug, so that it can be opened, and be swabbed out from time to time, as it becomes foul. Behind the truck is a horizontal shaft, G, extending each way beyond the wheels, for reaching over the outside rows, and carrying three or more revolving screens or sieves, H, for sprinkling on powdered substances. Said shaft is mounted on the rear end of the frame I, which is jointed to the truck at J, and suspended from the frame M by ropes L, which are wound up on the shaft N, or let out from it, to shift the screens according to the height of the plants. The shaft is revolved by a belt, O, from one of the wheels of the truck, working on cone-pulleys P O, for varying the speed of the screens or sieves, as may be required. The pulley O on the shaft G connects with it by a clutch, R, which is connected with a shifting-lever, S, for throwing the shaft out of gear when turning around at the ends of the rows, to save waste of material. T is a box for carrying the stock of powder, from which to replenish the screens or sieves as they become exhausted from time to time. Said box may be also used for a seat for the driver. The sieves are supplied through an opening in the ends, which may be closed by a gate or door of any kind, or by an opening in the side similarly closed. Both attachments, the one with sieves for sifting on in powder, and the one for sprinkling in fluid, are detachably connected to the frame.

When it is desired to put on the poison with the sieves, in powder, the sprinkling attachment is used for the purpose of dampening the plant, causing the powder to adhere more firmly, so that the process may be continued through the whole day.

If it is desired to put on the poison in liquid, then the sprinkling attachment need only be used.

Having thus described my invention, I claim as new and desire to secure by Letters Patent—

The combination, in the same wheeled vehicle, of a front sprinkling device, B C, and a rear powdering device, G H, operating substantially as described, whereby plants are first dampened with water and then overspread with poisonous powder, the latter being caused by the former to adhere to the plant.

WILLIAM T. ROBINSON.

Witnesses:
L. A. ABERCROMBIE,
THOS. J. GOREE,